(12) United States Patent
Siy, Jr.

(10) Patent No.: US 10,093,240 B2
(45) Date of Patent: Oct. 9, 2018

(54) OBJECT STORAGE ASSEMBLY

(71) Applicant: Leonardo Siy, Jr., Toronto (CA)

(72) Inventor: Leonardo Siy, Jr., Toronto (CA)

( * ) Notice: Subject to any disclaimer, the term of this patent is extended or adjusted under 35 U.S.C. 154(b) by 139 days.

(21) Appl. No.: 15/068,241

(22) Filed: Mar. 11, 2016

(65) Prior Publication Data

US 2017/0259748 A1    Sep. 14, 2017

(51) Int. Cl.
B60R 7/06 (2006.01)
B60R 7/10 (2006.01)

(52) U.S. Cl.
CPC . B60R 7/06 (2013.01); B60R 7/10 (2013.01)

(58) Field of Classification Search
CPC ................................. B60R 7/06; B60R 7/10
USPC ........................................................ 224/483
See application file for complete search history.

(56) References Cited

U.S. PATENT DOCUMENTS

| | | | |
|---|---|---|---|
| D338,780 S | 8/1993 | Rance | |
| 5,667,115 A | 9/1997 | Verhaeg | |
| 5,795,005 A * | 8/1998 | Garfias | B60R 7/046 220/9.2 |
| 5,967,602 A * | 10/1999 | Ptak | B60R 7/043 224/275 |
| 6,863,329 B2 | 3/2005 | Fero | |
| 7,309,045 B2 | 12/2007 | Melberg et al. | |
| 7,513,007 B2 | 4/2009 | Chernoff | |
| 7,780,229 B2 * | 8/2010 | Verhee | B60R 7/043 297/188.08 |
| 8,083,280 B2 | 12/2011 | Muglia et al. | |
| 9,016,749 B2 * | 4/2015 | Mueller | B60R 5/006 296/37.14 |
| 9,238,440 B1 * | 1/2016 | Bowser | B60R 7/084 |
| 2005/0046317 A1 * | 3/2005 | Howard | E05B 65/46 312/334.27 |
| 2010/0270821 A1 * | 10/2010 | Ulita | B60R 5/04 296/37.14 |
| 2011/0241374 A1 * | 10/2011 | Graves | B60N 3/06 296/75 |
| 2014/0001798 A1 * | 1/2014 | Kalergis | B60R 7/043 297/188.08 |

* cited by examiner

Primary Examiner — Peter Helvey

(57) ABSTRACT

An object storage assembly includes a pair of storage units. Each of the storage units may be positioned beneath a dashboard of a vehicle on a passenger side of the vehicle. Each of the storage units has a rear wall and a front side. The rear wall corresponding to each of the storage units is curved. Thus, the rear wall corresponding to each of the storage units may follow a contour of a floorboard of the vehicle beneath the dashboard. A passenger may sit in the passenger side of the vehicle when the storage units are positioned beneath the dashboard. The front side corresponding to each of the storage units is open to store objects.

5 Claims, 4 Drawing Sheets

OBJECT STORAGE ASSEMBLY

BACKGROUND OF THE DISCLOSURE

Field of the Disclosure

The disclosure relates to storage devices and more particularly pertains to a new storage device that may follow contours of a floorboard beneath a dashboard of a vehicle.

SUMMARY OF THE DISCLOSURE

An embodiment of the disclosure meets the needs presented above by generally comprising a pair of storage units. Each of the storage units may be positioned beneath a dashboard of a vehicle on a passenger side of the vehicle. Each of the storage units has a rear wall and a front side. The rear wall corresponding to each of the storage units is curved. Thus, the rear wall corresponding to each of the storage units may follow a contour of a floorboard of the vehicle beneath the dashboard. A passenger may sit in the passenger side of the vehicle when the storage units are positioned beneath the dashboard. The front side corresponding to each of the storage units is open to store objects.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
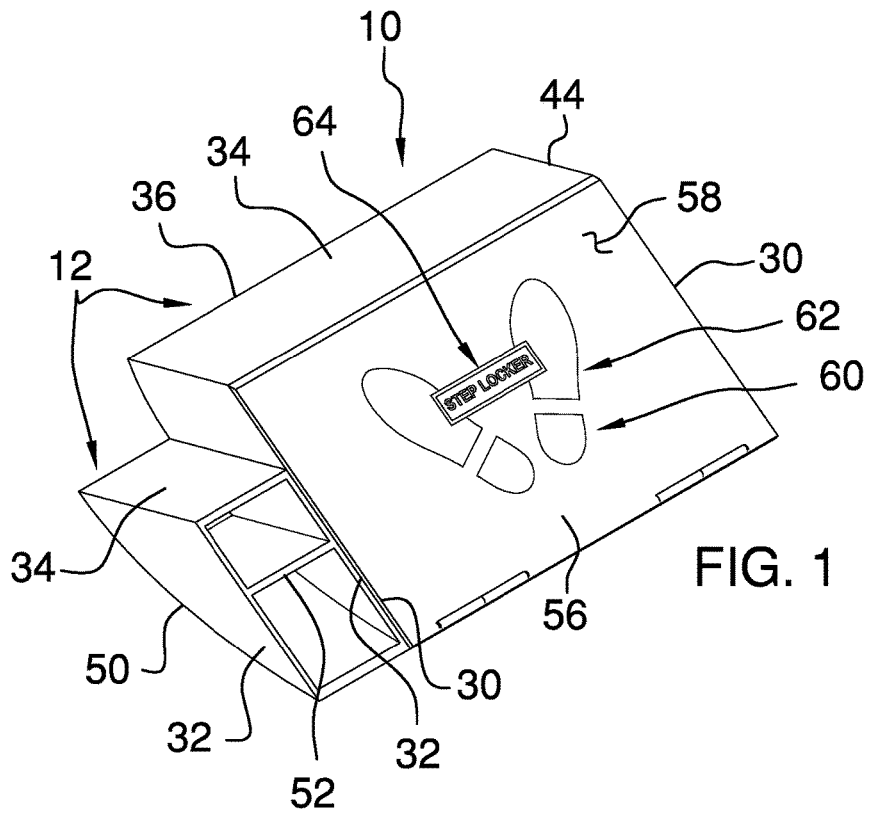
FIG. 1 is a front perspective view of an object storage assembly according to an embodiment of the disclosure.
Figure 2:
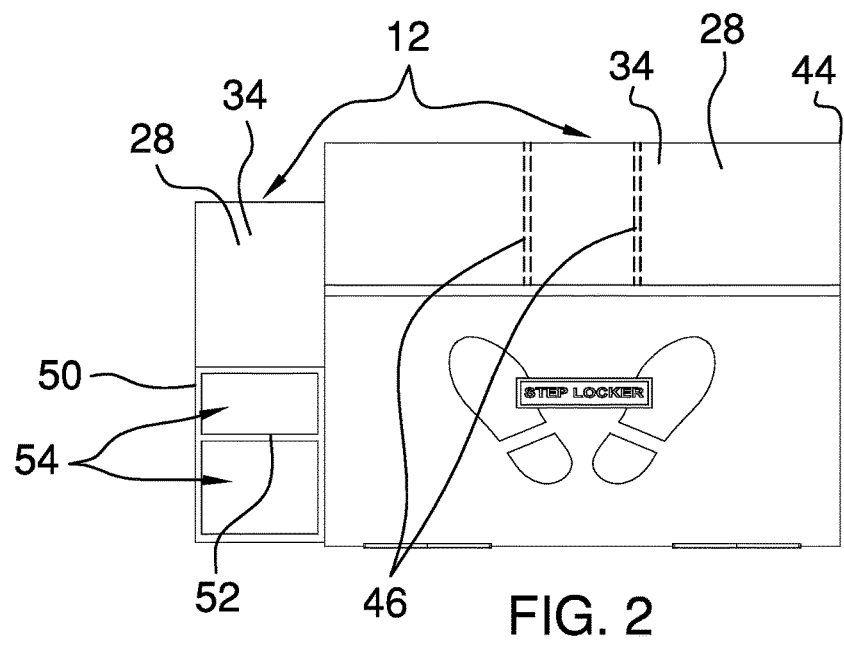
FIG. 2 is a front view of an embodiment of the disclosure.
Figure 3:
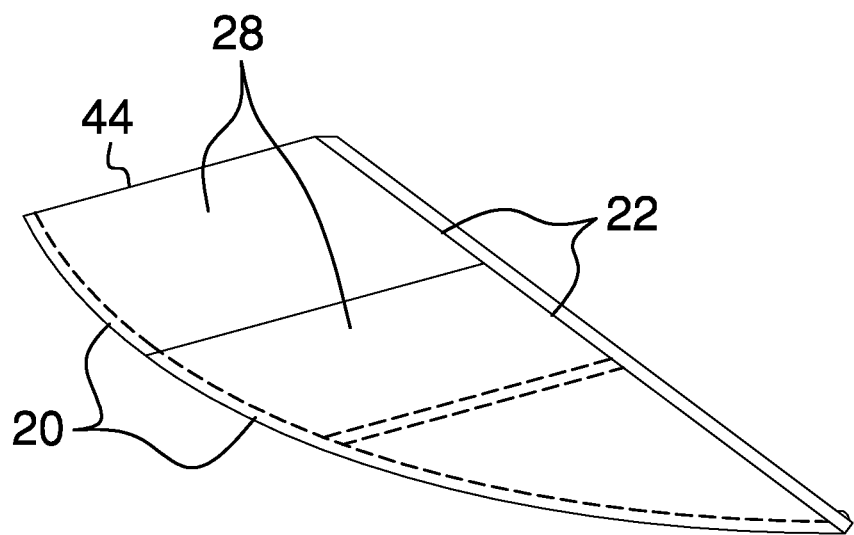
FIG. 3 is a left side phantom view of an embodiment of the disclosure.
Figure 4:
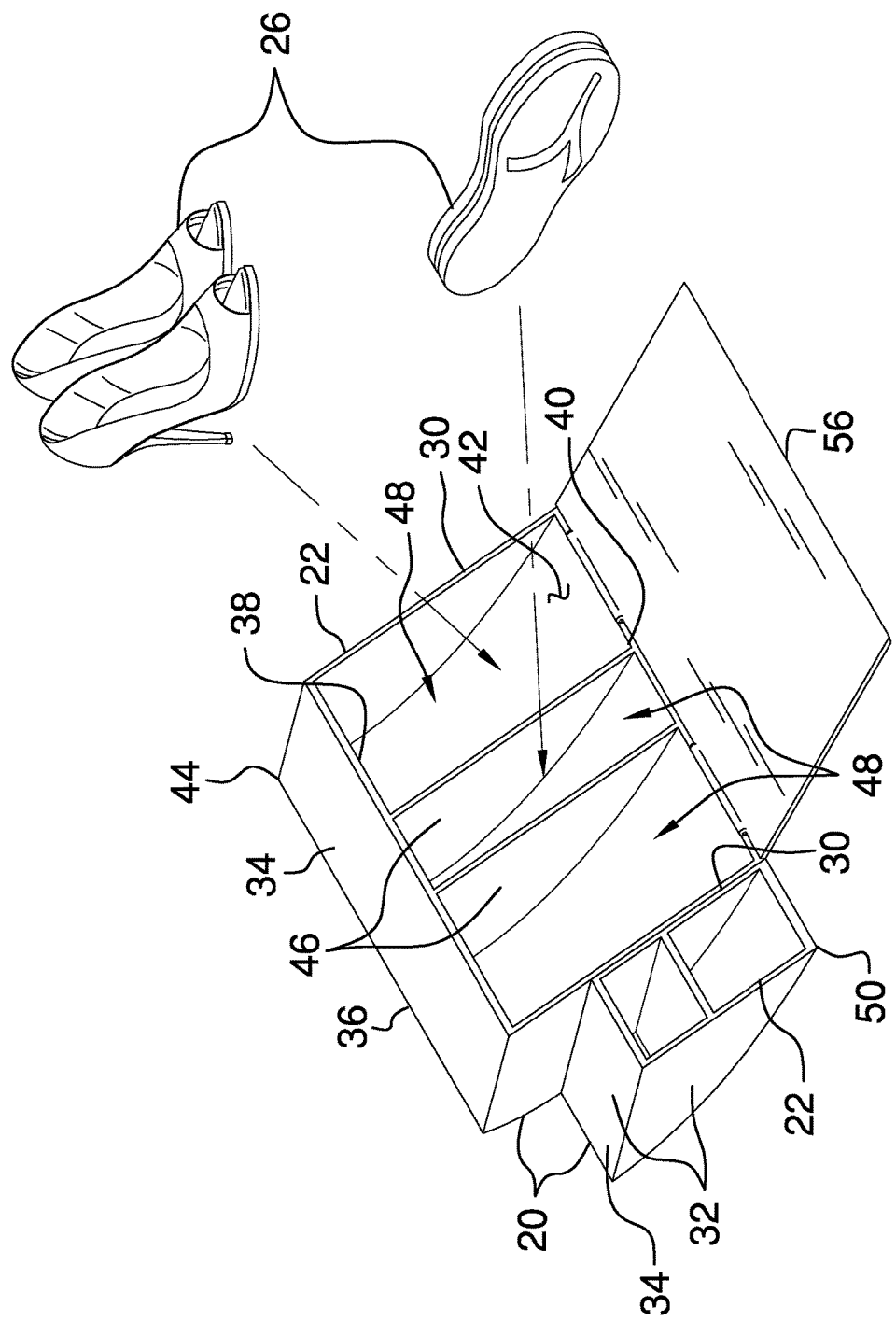
FIG. 4 is a perspective view of an embodiment of the disclosure.
Figure 5:
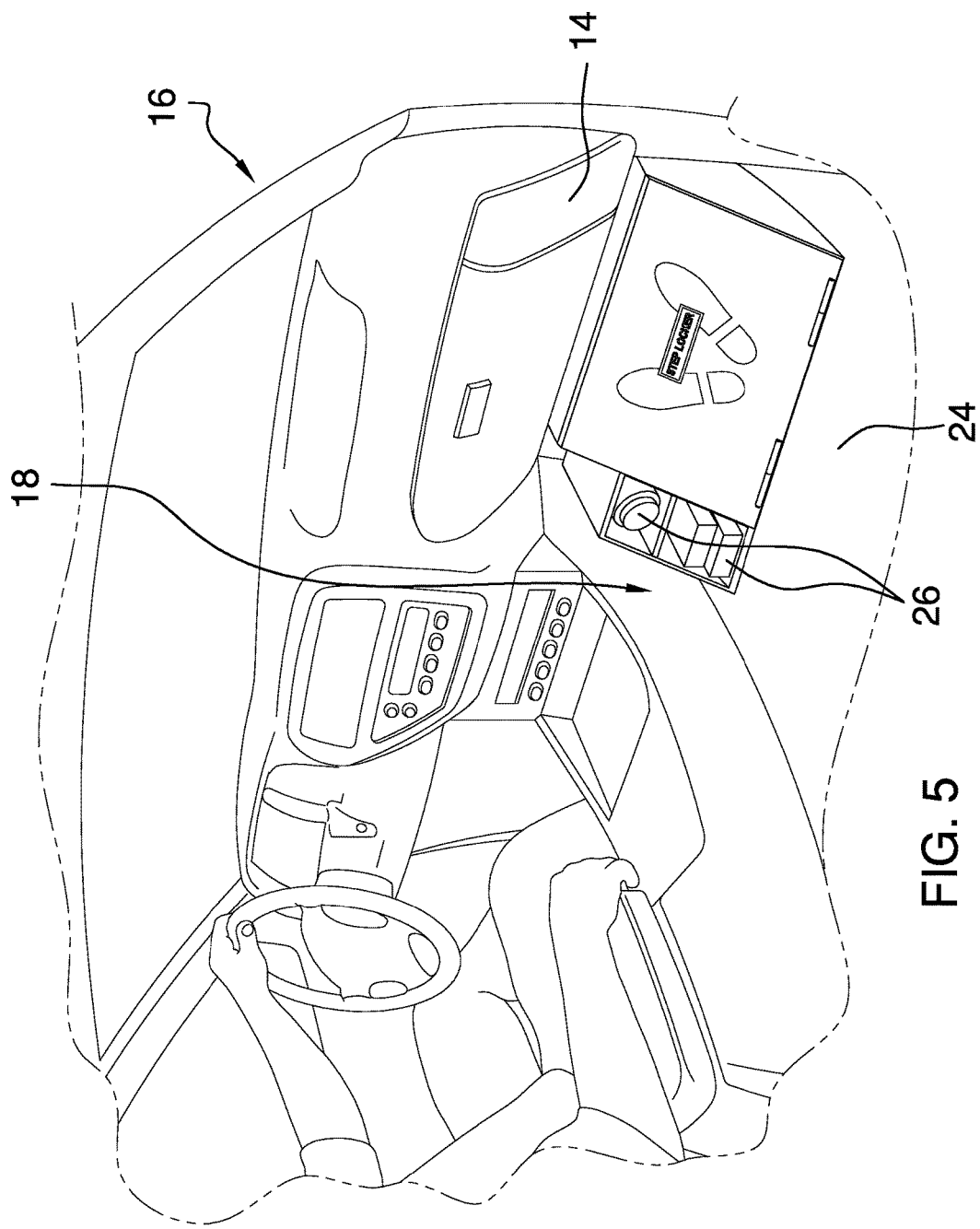
FIG. 5 is a perspective in-use view of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the object storage assembly 10 generally comprises a pair of storage units 12. Each of the storage units 12 may be positioned beneath a dashboard 14 of a vehicle 16. The vehicle 16 may be a passenger vehicle or the like. Each of the storage units 12 may be positioned on a passenger side 18 of the vehicle 16.

Each of the storage units 12 has a rear wall 20 and a front side 22. The rear wall 20 corresponding to each of the storage units 12 is curved. The rear wall 20 corresponding to each of the storage units 12 follows a contour of a floorboard 24 of the vehicle 16 beneath the dashboard 14. Thus, a passenger may sit in the passenger side 18 of the vehicle when the storage units 12 are positioned beneath the dashboard 14.

The front side 22 corresponding to each of the storage units 12 is open. Thus, each of the storage units 12 may store objects 26. Each of the storage units 12 has a peripheral wall 28 extending forwardly from the rear wall 20. The peripheral wall 28 has a first lateral side 30, a second lateral side 32 and a top side 34. The top side 34 has a rear edge 36 and an inner surface 38. The rear wall 20 corresponding to each of the storage units 12 has a forward edge 40 and an inner surface 42. The rear wall 20 corresponding to each of the storage units 12 curves outwardly between the forward edge 40 and the rear edge 36 of the top side 34.

The pair of storage units 12 includes a first storage unit 44. The first storage unit 44 has a pair of dividers 46. Each of the dividers 46 extends between the inner surface 42 of the rear wall 20 corresponding to the first storage unit 44 and the inner surface of the top side 34 corresponding to the first storage unit 44. The dividers 46 are spaced apart from each other. The dividers 46 are distributed between the first lateral side 30 corresponding to the first storage unit 44 and the second lateral side 32 corresponding to the first storage unit 44. Thus, the dividers 46 define a plurality of spaces 48 in the first storage unit 44 to contain the objects 26.

The pair of storage units 12 includes a second storage unit 50. The second storage unit 50 has a height that is less than a height of the first storage unit 44. Thus, the top side 34 corresponding to the second storage unit 50 is spaced downwardly from the top side 34 corresponding to the first storage unit 44. The first lateral side 30 corresponding to the second storage unit 50 is coupled to the second lateral side 32 corresponding to the first storage unit 44.

The second storage unit 50 includes a shelf 52. The shelf 52 extends between the first lateral side 30 corresponding to the second storage unit 50 and the second lateral side 50 corresponding to the second storage unit 50. Thus, the shelf 52 defines a pair of slots 54 in the second storage unit 50. Each of the slots 54 may contain the objects 26.

A door 56 is hingedly coupled to the forward edge 40 corresponding to the first storage unit 44. The door 56 extends between the first lateral wall 30 corresponding to the first storage unit 44 and the second lateral wall 32 corresponding to the first storage unit 44. The door 56 is positioned in a closed position. Thus, the door 56 covers the front side 22 corresponding to the first storage unit 44. The door 56 is positioned in an open position such that the front side 22 corresponding to the first storage unit 44 is exposed.

The door 56 has a first surface 58. Indicia 60 are printed on the first surface 58. The indicia 60 may comprise an image 62 and lettering 64. The image 62 may comprise an image of shoes or the like. The lettering 64 may comprise the words "step locker" or the like.

In use, the pair of storage units 12 is positioned in the floorboard 24 beneath the dashboard 14. The front side 22 of each of the storage units 12 is substantially aligned with the dashboard 14. Selected objects 26 are positioned in each of the slots 54 in the second storage unit 50. The door 56 is positioned in the open position and selected objects 26 are positioned in each of the spaces 48 in the first storage unit 44. The door 56 is positioned in the closed position to retain the objects 26 in the first storage unit 44. The door 56 is positioned in the open position to retrieve the objects 26 from the first storage unit 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An object storage assembly being configured to organize objects beneath a dashboard of a vehicle, said assembly comprising:
   a pair of storage units, each of said storage units being configured to be positioned beneath a dashboard of a vehicle on a passenger side of the vehicle, each of said storage units having a rear wall and a front side, said rear wall corresponding to each of said storage units being curved wherein said rear wall corresponding to each of said storage units is configured to follow a contour of a floorboard of the vehicle beneath the dashboard thereby facilitating a passenger to sit in the passenger side of the vehicle when said storage units are positioned beneath the dashboard, said front side corresponding to each of said storage units being open wherein each of said storage units is configured to store objects;
   each of said storage units comprising a peripheral wall extending forwardly from said rear wall, said peripheral wall having a first lateral side, a second lateral side and a top side, said top side having a rear edge and an inner surface, said rear wall having a forward edge and an inner surface, said rear wall curving outwardly between said forward edge and said rear edge of said top side; and
   said pair of storage units including a first storage unit, said first storage unit having a pair of dividers, each of said dividers extending between said inner surface of said rear wall corresponding to said first storage unit and said inner surface of said top side corresponding to said first storage unit, said dividers being spaced apart from each other and distributed between said first lateral side corresponding to said first storage unit and said second lateral side corresponding to said first storage unit to define a plurality of spaces in said first storage unit wherein each of said spaces is configured to contain the objects.

2. An object storage assembly being configured to organize objects beneath a dashboard of a vehicle, said assembly comprising:
   a pair of storage units, each of said storage units being configured to be positioned beneath a dashboard of a vehicle on a passenger side of the vehicle, each of said storage units having a rear wall and a front side, said rear wall corresponding to each of said storage units being curved wherein said rear wall corresponding to each of said storage units is configured to follow a contour of a floorboard of the vehicle beneath the dashboard thereby facilitating a passenger to sit in the passenger side of the vehicle when said storage units are positioned beneath the dashboard, said front side corresponding to each of said storage units being open wherein each of said storage units is configured to store objects;
   each of said storage units comprising a peripheral wall extending forwardly from said rear wall, said peripheral wall having a first lateral side, a second lateral side and a top side, said top side having a rear edge and an inner surface, said rear wall having a forward edge and an inner surface, said rear wall curving outwardly between said forward edge and said rear edge of said top side; and
   said pair of storage units includes a first storage unit and a second storage unit, said second storage unit having a height being less than a height of said first storage unit such that said top side corresponding to said second storage unit is spaced downwardly from said top side corresponding to said first storage unit, said first lateral side corresponding to said second storage unit being coupled to said second lateral side corresponding to said first storage unit.

3. The assembly according to claim 2, wherein said second storage unit has a shelf extending between said first lateral side corresponding to said second storage unit and said second lateral side corresponding to said second storage unit to define a pair of slots in said second storage unit wherein each of said slots is configured to contain the objects.

4. The assembly according to claim 1, further comprising a door being hingedly coupled to said forward edge corresponding to said first storage unit, said door extending between said first lateral wall corresponding to said first storage unit and said second lateral wall corresponding to said first storage unit, said door being positioned in a closed position such that said door covers said front side corresponding to said first storage unit, said door being positioned in an open position such that said front side corresponding to said first storage unit is exposed.

5. An object storage assembly being configured to organize objects beneath a dashboard of a vehicle, said assembly comprising:
   A pair of storage units, each of said storage units being configured to be positioned beneath a dashboard of a vehicle on a passenger side of the vehicle, each of said storage units having a rear wall and a front side, said rear wall corresponding to each of said storage units being curved wherein said rear wall corresponding to each of said storage units is configured to follow a contour of a floorboard of the vehicle beneath the dashboard thereby facilitating a passenger to sit in the passenger side of the vehicle when said storage units are positioned beneath the dashboard, said front side corresponding to each of said storage units being open wherein each of said storage units is configured to store objects, each of said storage units comprising:
   a peripheral wall extending forwardly from said rear wall, said peripheral wall having a first lateral side, a second lateral side and a top side, said top side having a rear edge and an inner surface, said rear wall having a forward edge and an inner surface, said rear wall curving outwardly between said forward edge and said rear edge of said top side, said pair of storage units including a first storage unit and a second storage unit, said first storage unit having a pair of dividers, each of said dividers extending between said inner surface of said rear wall corresponding to said first storage unit and said inner surface of said top side corresponding to said first storage unit, said dividers being spaced apart from each other and distributed between said first lateral side corresponding to said first storage unit and said second lateral side corresponding to said first storage unit to define a plurality of spaces in said first storage unit wherein each of said spaces is configured to contain the objects, and said second storage unit having a height being less than a height of said first storage unit such that said top side corresponding to said second storage unit is spaced downwardly from said top side corresponding to said first storage unit, said first lateral side corresponding to said second storage unit being coupled to said second lateral side corresponding to said first storage unit, said second storage unit having a shelf extending between said first lateral side corresponding to said second storage unit and said second lateral side corresponding to said second storage unit to define a pair of slots in said second storage unit wherein each of said slots is configured to contain the objects; and a door being hingedly coupled to said forward edge corresponding to said first storage unit, said door extending between said first lateral wall corresponding to said first storage unit and said second lateral wall corresponding to said first storage unit, said door being positioned in a closed position such that said door covers said front side corresponding to said first storage unit, said door being positioned in an open position such that said front side corresponding to said first storage unit is exposed.

* * * * *